(12) United States Patent
Chapus et al.

(10) Patent No.: US 8,877,993 B2
(45) Date of Patent: Nov. 4, 2014

(54) PROCESS FOR EBULLATED BED HYDROCONVERSION OF FEEDS OF BIO-RENEWABLE ORIGIN FOR THE PRODUCTION OF FUEL BASES

(75) Inventors: Thierry Chapus, Lyons (FR); Alain Quignard, Roussillon (FR); Nathalie Dupassieux, Lyons (FR); Antoine Daudin, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 1025 days.

(21) Appl. No.: 12/282,910

(22) PCT Filed: Jul. 18, 2008

(86) PCT No.: PCT/FR2008/001065
§ 371 (c)(1),
(2), (4) Date: Aug. 31, 2010

(87) PCT Pub. No.: WO2009/037400
PCT Pub. Date: Mar. 26, 2009

(65) Prior Publication Data
US 2010/0325943 A1 Dec. 30, 2010

(30) Foreign Application Priority Data
Jul. 25, 2007 (FR) ..................... 07 05444

(51) Int. Cl.
*C10G 3/00* (2006.01)
*C10G 49/04* (2006.01)
*C10G 49/12* (2006.01)

(52) U.S. Cl.
CPC ........ *C10G 49/04* (2013.01); *C10G 2300/1018* (2013.01); *C10G 2400/08* (2013.01); *C10G 3/46* (2013.01); *C10G 2300/4018* (2013.01); *C10G 3/48* (2013.01); *C10G 3/50* (2013.01); *C10G 2400/06* (2013.01); *C10G 2300/301* (2013.01); *C10G 2300/1014* (2013.01); *C10G 3/56* (2013.01); *C10G 49/12* (2013.01)
USPC .......................................... 585/240; 585/733

(58) Field of Classification Search
USPC ................................. 585/240, 733
See application file for complete search history.

(56) References Cited

U.S. PATENT DOCUMENTS

| | | | |
|---|---|---|---|
| RE25,770 E * | 4/1965 | Johanson | 208/408 |
| 3,705,850 A | 12/1972 | Wolk | |
| 4,992,605 A * | 2/1991 | Craig et al. | 585/240 |
| 5,705,722 A * | 1/1998 | Monnier et al. | 585/240 |
| 6,200,927 B1 * | 3/2001 | Shukis et al. | 502/355 |
| 6,270,655 B1 * | 8/2001 | Ganguli | 208/85 |
| 6,436,279 B1 | 8/2002 | Colyar | |
| 2006/0186020 A1 | 8/2006 | Gomes | |
| 2006/0207166 A1 * | 9/2006 | Herskowitz et al. | 44/385 |
| 2007/0010682 A1 * | 1/2007 | Myllyoja et al. | 554/174 |

FOREIGN PATENT DOCUMENTS

| | | |
|---|---|---|
| EP | 0 177 102 A1 | 4/1986 |
| EP | 1 693 432 A1 | 8/2006 |
| EP | 1 741 767 A1 | 1/2007 |
| WO | WO 2008/020048 A2 | 2/2008 |
| WO | WO 2008020048 A2 * | 2/2008 ............... C10G 3/00 |
| WO | WO 2008151792 A1 * | 12/2008 ............... G10G 3/00 |

OTHER PUBLICATIONS

Lewis, "Phosphoric Anhydride" in Hawley's Condensed Chemical Dictionary, R. John Wiley & Sons, 14th ed., 2002, available on-line at www.knovel.com.*
International Search Report of PCT/FR2008/001065 (Jun. 26, 2009).

* cited by examiner

*Primary Examiner* — In Suk Bullock
*Assistant Examiner* — Bradley Etherton
(74) *Attorney, Agent, or Firm* — Millen, White, Zelano, Branigan, P.C.

(57) ABSTRACT

The invention concerns a process for hydrotreatment and/or hydroconversion of a feed of bio-renewable origin containing triglyceride and/or fatty acid structures and wherein the fatty chains contain in the range 8 to 25 carbon atoms, said process comprising the following steps:
a) hydrotreatment and/or hydroconversion of said bio-renewable feed in an ebullated bed reactor in the presence of a granular catalyst comprising, on an amorphous support, at least one metal or compound of a metal having a hydrodehydrogenating function, to produce a first effluent;
b) sending the effluent produced in step a) to a distillation zone from which a gaseous fraction and at least one distillate cut the end point of which is less than 400° C.

13 Claims, No Drawings

PROCESS FOR EBULLATED BED HYDROCONVERSION OF FEEDS OF BIO-RENEWABLE ORIGIN FOR THE PRODUCTION OF FUEL BASES

FIELD OF THE INVENTION

The present invention relates to a process for hydrotreatment and/or hydroconversion of a feed constituted by a mixture of crude oils of vegetable or animal origin.

In a context marked by the rapid growth in the need for fuel, in particular gas oil bases in the European Union, combined with the high price of fossil resources, the development of lasting technological solutions and energy systems for the transport sector has become a priority.

Thus, integrating novel products of vegetable origin derived from the conversion of lignocellulosic biomass or from the production of vegetable oils or animal fats into the refining process has in recent years seen somewhat of a resurgence.

Similarly, the experience of incorporating vegetable oil methyl esters (VOME) into gas oil or ethanol incorporated directly or in the form of ETBE into gasoline has been generally satisfactory, so that the position of the oil industry as regards biofuels has developed in a positive manner.

Their production is underscored by the European Directive on the Incorporation of Biofuels (2003/30/CE) at a minimum of 2% in 2005, 5.75% in 2010 and 8% in 2015 of the consumption of all gasoline and gas oil used for transport.

However, that type of process is relatively expensive and the products obtained in the case of VOME have characteristics which may be prohibitive; examples which may be cited are limited cold properties, cetane numbers which only just satisfy specifications; a relatively high and very narrow distillation range.

There exists another route to producing fuel bases from vegetable oils and animal fats. It consists of the catalytic and direct transformation of oils by total hydrogenation of triglycerides in the presence of a hydroconversion catalyst. The triglycerides are then converted into paraffins, thereby constituting excellent fuel bases, in particular gas oil bases with a very high cetane number.

A number of patents make reference to this field. U.S. Pat. No. 4,992,605 and U.S. Pat. No. 5,705,722 are concerned with the production of gas oil bases obtained by direct hydrotreatment, in a fixed bed type reactor, of vegetable oils (rapeseed oil, soya oil, sunflower seed oil, African oil, pine oil).

Further, EP-1 728 844 discloses a process for the hydrotreatment of vegetable oils and/or crude animal fats as well as oils derived from the wood industry, wherein the hydrotreatment step is preceded by a step for pre-treatment of the feed to eliminate at least part of the metals present (P, Mg, Na, Ca, Fe, K) using an ion exchange resin such as Amberlyst 15 or by an acid wash. The purified feed is hydrotreated in a fixed bed reactor. The products obtained are paraffinic hydrocarbons with a very high cetane number.

EP-A-0 177 102, concerning the use of a catalyst for the hydroconversion of oil fractions, mentions the fixed bed or ebullated bed use for desulphurization, denitrogenation or hydrocracking of oil fractions and cites the hydrogenation of vegetable and animal oils without any precise description. The catalyst therein is a catalyst of the Mo or W sulphide type (11-18% by weight) promoted by Co or Ni (3-4% by weight) supported on alumina and/or silica, with the addition of a metal oxide (ZnO, MgO, CaO).

Some processes are carried out with a dispersed catalyst (slurry, fluidized bed). Invention does not work according to such modes.

The process of the present invention allows the production, starting from a feed of bio-renewable origin of the vegetable or animal oil type and containing triglyceride and/or fatty acid structures with fatty chains generally containing in the range 8 to 25 carbon atoms, of fuel bases with very good properties, in particular in terms of the combustion properties (cetane number, smoke point), thermal and storage stability, using a catalyst which is free of Zn, Mg, Ca.

The Applicant has in particular discovered that carrying out ebullated bed hydrotreatment and/or hydroconversion can overcome problems regarding contamination of the catalyst linked to the formation of water and oxides of carbon by hydrodeoxygenation reactions and to the deposition of impurities (phospholipids, serols, metals, free fatty acids, etc) naturally present in the oils and in particular in the crude oils. These problems with contamination of the catalyst are particularly crucial for a fixed bed type reactor operation.

Further, according to the process of the invention, it is possible to directly treat crude vegetable oils and/or animal fats (crude feed) without having to carry out a prior, restrictive supplemental purification step.

SUBJECT MATTER OF THE INVENTION

The present invention concerns an ebullated bed process for hydrotreatment (HDT) and/or hydroconversion (HDC) of feeds of bio-renewable origin for the production of fuel bases.

The starting feeds are derived from sources which are termed bio-renewable, such as vegetable oils and animal fats, or mixtures of said feeds in all proportions. Examples which may be cited are rapeseed, soya, sunflower seed, African, palm nut, olive, coprah, castor and cotton seed oil, peanut, linseed and crambe oils, as well as jatropha oil. This non-limiting list also includes all oils obtained by genetic modification or hybridization. Cooking oils as well as all oils or fats from the retail food industry may also be used. Animal fats such as fish oil, tallow or suet are also feeds which may be used in the present invention. The feeds defined here contain triglyceride and/or fatty acid structures with fatty chains which generally contain in the range 8 to 25 carbon atoms.

The invention can hydrotreat and/or hydroconvert feeds of bio-renewable origin into excellent quality fuel bases, in particular in terms of the smoke point of the kerosene cuts obtained and the cetane number of gas oil cuts which is excellent, satisfying the most severe current and future specifications.

The hydrocarbons produced during conversion are obtained either by decarboxylation and/or decarbonylation involving the loss of one carbon of the starting fatty chain, or by hydrogenation/dehydration to completely convert the hydrocarbon chain. It is also possible to orientate the transformation towards cracking, to obtain products with a lower molecular mass such as jet fuel or even gasoline.

The ebullated bed process of the invention is aimed at maximizing the yield of fuel bases in a single step, advantageously without prior pre-treatment of the feed, while limiting problems with contamination of the catalyst linked to the origin of the feed and to the formation of unwanted co-products such as water and oxides of carbon.

DESCRIPTION OF THE INVENTION

The present invention relates to the preparation of fuel bases satisfying new environmental specifications, from feeds derived from bio-renewable sources by ebullated bed hydrotreatment and/or hydroconversion.

More precisely, the present invention provides a process for treating a feed of bio-renewable origin containing triglyceride and/or fatty acid structures and wherein the fatty chains contain in the range 8 to 25 carbon atoms, said process comprising the following steps:

a) hydrotreatment and/or hydroconversion of said bio-renewable feed in an ebullated bed reactor in the presence of a granular catalyst (grains, beads, extrudates) comprising, on an amorphous support, at least one metal or compound of a metal having a hydrodehydrogenating function, to produce a first effluent;

b) sending the effluent produced in step a) to a distillation zone from which a gaseous fraction and at least one distillate cut the end point of which is less than 400° C. are recovered.

The starting feeds are derived from renewable sources, such as vegetable oils and animal fats, or mixtures of said feeds. Examples which may be cited are rapeseed, soya, sunflower seed, African, palm nut, olive, coprah, castor and cotton seed oil, peanut, linseed and crambe oils, and jatropha oil. This non-limiting list also includes all oils obtained by genetic modification or hybridization. Cooking oils as well as all oils or fats from the retail food industry may also be used. Animal fats such as fish oil, tallow or suet, are also feeds which may be used in the present invention. The present invention is applicable to all types of vegetable oils or animal fats The feeds defined here contain triglyceride and/or fatty acid structures with fatty chains which generally contain in the range 8 to 25 carbon atoms.

The feeds may contain phospholipids in amounts of up to 5% by weight, free fatty acids up to 5% by weight, nonsaponifiables up to 5% by weight such as sterols, triterpene alcohols, vitamins up to 1% such as tocopherols, coloured compounds up to 100 ppm such as carotenoids, various metals and minerals up to 200 ppm, sulphur-containing compounds up to amounts of the order of 2000 ppm, and nitrogen-containing compounds up to amounts of 2% by weight.

The densities at 15° C. of said oils are in the range 850 to 970 kg/m³ and their kinematic viscosities at 40° C. are in the range 20 to 400 mm²/s, more generally in the range 30 to 50 mm²/s. Said feeds generally have low aromatics contents, less than 5% by weight.

Description of Hydrotreatment/Hydroconversion Step a)

The conditions of step a) for treatment of the feed in the presence of hydrogen are close to the conventional ebullated bed hydroconversion conditions of a liquid hydrocarbon fraction.

A conventional granular hydrotreatment and/or hydroconversion catalyst may be used comprising, on an amorphous support, at least one metal or compound of a metal having a hydrodehydrogenating function. This catalyst is advantageously a catalyst comprising at least one group VIII metal, preferably nickel and/or cobalt, usually in combination with at least one metal from group VIB, preferably molybdenum and/or tungsten. The catalyst does not contain element from group IIA or IIB, as for example Zn, Mg or Ca. As an example, a catalyst could be used comprising (or advantageously constituted by) 0.5% to 10% by weight of nickel, preferably 1 to 5% by weight of nickel (expressed as nickel oxide, NiO) and 1% to 30% by weight of molybdenum, preferably 5% to 20% by weight of molybdenum (expressed as molybdenum oxide, $MoO_3$) on an amorphous mineral support. This support may, for example, be selected from the group formed by alumina, silica, silica-aluminas, magnesia, clays and mixtures of at least two of said minerals. Advantageously, said support comprises other doping compounds, especially oxides selected from the group formed by boron oxide, zirconia, titanium oxide, phosphoric anhydride. Usually, an alumina support is used, more usually an alumina support doped with phosphorus and optionally boron. The concentration of phosphoric anhydride, $P_2O_5$, is normally in the range 0 to about 10% by weight. The concentration of boron trioxide, $B_2O_3$, is normally in the range 0 to 10% by weight. The alumina used is usually a γ or η alumina. Said catalyst is usually in the form of extrudates. The total amount of oxides of groups VI and VIII metals is usually about 5% to about 40% by weight, and generally about 7% to 30% by weight, and the weight ratio, expressed as the metallic oxide, between the group VI metal (or metals) and the group VIII metal (or metals) is generally from about 20 to about 1, usually from about 10 to about 2.

The used catalyst is partly replaced with fresh catalyst by withdrawal from the bottom of the reactor and introduction of fresh catalyst or new catalyst to the top of the reactor at regular intervals, i.e. in batches or practically continuously. As an example, it may be possible to introduce fresh catalyst every day. The ratio of replacement of the used catalyst by fresh catalyst may be from about 0.01 kilograms to about 10 kilograms per cubic meter of feed, preferably in the range 0.3 to 3 kilograms per cubic meter of feed. Said withdrawal and replacement are carried out using devices allowing the continuous function of this hydrotreatment/hydroconversion step. The unit normally comprises a recirculation pump which can maintain the catalyst in an ebullated bed by continuous recycling of at least part of the liquid withdrawn from the head of the reactor and re-injection into the reactor bottom. It is also possible to send the used catalyst withdrawn from the reactor to a regeneration zone in which the carbon and impurities it contains are eliminated, then to return the regenerated catalyst to the converting hydrotreatment step.

Usually, this step a) is carried out under the conditions of the H-OilDC® process as described, for example, in the article Heavy Oil Hydroprocessing, published by Aiche, Mar. 19-23, 1995, Houston, Tex., paper number 42d. The principle of this technology is also described in U.S. Pat. No. 6,436,279. In particular, it describes that a mixture of liquid and hydrogen passes from the bottom to the top of bed of catalyst at a rate such that the particles of catalyst move. The top of the bed expands compared with its top at rest. The expansion ratio is defined as follows:

Degree of expansion=100×(height of ebullated bed−height of bed at rest)/height of bed at rest.

Ebullition of the catalyst bed is controlled by the recycle rate of a portion of the converted feed. This liquid acting to ebullate the bed may be obtained by separation in a high pressure separator or at the bottom of an atmospheric column. The degree of ebullition recycle is defined as the ratio of the hourly flow rate of recycled liquid over the hourly flow rate of fresh feed entering the reactor. Normally, a recycle rate in the range 2 to 10 is used. The corresponding expansion ratio of the bed is thus in the range 10% to 50%. In accordance with the present invention, one of the aims of which is to produce high quality fuel bases, it is preferable to use a recycle ratio in the range 0.67 to 1.5 and an expansion ratio in the range 15% to 25%.

Normally, the absolute operational pressure is 2 to 35 MPa, usually 2 to 15 MPa and most usually 3 to 10 MPa, at a temperature of about 200° C. to about 450° C., and usually about 250° C. to about 380° C. The hourly space velocity (HSV) and the partial pressure of hydrogen are important factors which are selected as a function of the characteristics of the product to be treated and the desired conversion. The conversion/temperature/pressure combination is selected so as to obtain the best conversion/product quality compromise.

Usually, the HSV is in the range from about 0.1 h$^{-1}$ to about 10 h$^{-1}$, preferably about 0.5 h$^{-1}$ to about 5 h$^{-1}$. The quantity of hydrogen mixed with the feed is normally about 50 to about 5000 normal cubic meters (Nm$^3$) per cubic meter (m$^3$) of liquid feed and usually from about 100 to about 1000 Nm$^3$/m$^3$ and preferably from about 200 to about 500 Nm$^3$/m$^3$.

Description of Step b)

In a preferred implementation of the invention, at least a portion, usually all, of the effluent obtained in step a) is sent to a distillation zone (step b)) from which a gaseous fraction and at least one distillate cut with an end point of less than 400° C. are usually recovered.

The distillate cut may then be sent directly to the fuel pools.

When carrying out the process of the invention, the kerosene base obtained after carrying out step b) generally has the characteristics shown in Table 1:

| Characteristic | Kerosene base |
|---|---|
| Distillation range (° C.) | 130-280 |
| Density (kg/m$^3$) | 760-770 |
| Cetane number (ASTM D613) | >45 |
| Smoke point (ASTM D1322) (mm) | >25 |
| Polyaromatics (% by weight) | <1 |
| Sulphur (ppm by weight) | <1 |
| Saybolt colour (ASTM D156) | >20 |
| Crystal disappearance point [freezing point determination] (ASTM D2386) (° C.) | <−47 |
| Thermal stability at 260° C. (JFTOT ASTM D3241) (mmHg) | <25 |
| Tube rater (visual) | <3 |

Good characteristics are obtained, inter alia, for the smoke point and the thermal stability.

Regarding the gas oil base obtained after carrying out step b), this generally has the characteristics shown in Table 2:

| Characteristic | Gas oil base |
|---|---|
| Distillation range | 180-400° C. |
| Density (kg/m$^3$) | 775-785 |
| Cetane number (ASTM D613) | >70 |
| Polyaromatics (% by weight) | <1 |
| Sulphur (ppm by weight) | <1 |
| Colour (ASTM D1500) | <0.5 |
| Pour point (ASTM D97) (° C.) | −5 to −30 |
| Stability on storage (ASTM D2274) (mg/l) | <10 |

Good characteristics were obtained, inter alia, for the cetane number and the stability on storage.

The scope of the invention will be better understood from the following examples.

EXAMPLES

Example 1

In Accordance with the Invention

A refined rapeseed oil containing 5 ppm of P and 5 ppm of Ca was treated in an ebullated bed in a "Robinson-Mahoney" type pilot reactor. The volume of the catalyst employed was 100 cm$^3$ (0.1 m$^3$) for a feed flow rate of 100 cm$^3$/h. The catalyst employed contained 4% by weight of nickel (expressed as the oxide, NiO) and 21% by weight of molybdenum (expressed in the oxide form, MoO$_3$) on an alumina support. The ebullated bed reactor was operated at a pressure of 5 MPa and a temperature of 350° C.

Under these conditions, the initial triglycerides conversion was 100% by weight, and after 1500 hours of operation it was 90% by weight. After 1500 hours of operation, the coke content measured on the catalyst was 4% by weight.

Example 2

Not in Accordance with the Invention

The same feed as that used in Example 1 was treated in a fixed bed type reactor containing a catalyst in the form of extrudates on an alumina support with the same composition as that used in Example 1.

The fixed bed reactor was operated at a pressure of 5 MPa and a temperature of 350° C.

Under these conditions, the initial triglycerides conversion was 100% by weight and after 1500 hours of operation it was 80% by weight. After 1500 hours of operation, the coke content measured on the catalyst was 7% by weight.

Example 3

In Accordance with the Invention

A slightly refined rapeseed oil containing 180 ppm of P and 150 ppm of Ca was treated in an ebullated bed in a "Robinson-Mahoney" type pilot reactor. The volume of the catalyst employed was 100 cm$^3$ for a feed flow rate of 100 cm$^3$/h. The catalyst employed contained 4% by weight of nickel (expressed as the oxide, NiO) and 21% by weight of molybdenum (expressed in the oxide form, MoO$_3$) on an alumina support. The ebullated bed reactor was operated at a pressure of 5 MPa and a temperature of 350° C.

Under these conditions, the initial triglycerides conversion was 100% by weight and after 1500 hours of operation it was 80% by weight. After 1500 hours of operation, the coke content measured on the catalyst was 5% by weight.

Example 4

Not in Accordance with the Invention

The same feed as that used in Example 3 was treated in a fixed bed type reactor containing a catalyst in the form of extrudates on an alumina support with the same composition as that used in Example 3. The fixed bed reactor was operated at a pressure of 5 MPa and a temperature of 350° C.

Under these conditions, the initial triglycerides conversion was 100% by weight and after 1500 hours of operation it was 50% by weight. After 1500 hours of operation, the coke content measured on the catalyst was 10% by weight.

The examples illustrate the advantages obtained by using an ebullated bed compared with a fixed bed. Thus, it is possible to obtain a conversion after 1500 hours which is substantially better, with less poisoning of the catalyst by coke. Further, the quality of the gas oil cut obtained by the ebullated bed process is equivalent to that obtained using the fixed bed process, in particular the cetane number (>70) and the density at 15° C. (in the range 775-785 kg/m$^3$).

The invention claimed is:

1. A process for hydrotreatment and/or hydroconversion of a feed consisting of bio-renewable vegetable oil or animal fat or a mixture thereof, said feed containing triglyceride and/or fatty acid structures and wherein the fatty chains contain in the range 8 to 25 carbon atoms, said process comprising:

a) hydrotreatment and/or hydroconversion of said bio-renewable feed in an ebullated bed reactor in the presence of a granular catalyst comprising, on an amorphous support with at least one dopant which is phosphoric anhydride, at least one metal or compound of a metal from Group VIII in combination with at least one metal from Group VIB, to produce a first effluent;

b) sending the effluent produced in a) to a distillation zone from which a gaseous fraction and at least one distillate cut the end point of which is less than 400° C. are recovered.

2. A process according to claim 1, in which said group VIII metal of the catalyst employed in a) is selected from nickel or cobalt.

3. A process according to claim 1, in which said catalyst contains no Zn, Mg or Ca.

4. A process according to claim 1, in which said metal from group VIB is selected from molybdenum or tungsten.

5. A process according to claim 1, in which said catalyst employed in a) comprises 0.5% to 10% by weight of nickel and 1% to 30% by weight of molybdenum.

6. A process according to claim 1, in which said catalyst employed in a) comprises an amorphous mineral support that is alumina, silica, silica-aluminas, magnesia, clays or mixtures of at least two of said minerals.

7. A process according to claim 1, in which a) is operated at an absolute pressure of 2 to 35 MPa, at a temperature in the range 200° C. to 450° C., at an hourly space velocity in the range 0.1 to 10 h$^{-1}$ and with a quantity of hydrogen mixed with the feed in the range 50 to 5000 Nm$^3$/m$^3$ of liquid feed.

8. A process according to claim 7, in which a) is operated at an absolute pressure of 3 to 10 MPa, at a temperature in the range 250° C. to 380° C., at an hourly space velocity in the range 0.5 to 5 h$^{-1}$ and with a quantity of hydrogen mixed with the feed in the range 200 to 500 Nm$^3$/m$^3$ of liquid feed.

9. A process according to claim 1, in which said ebullated bed reactor of a) is operated in such a manner that the degree of expansion of the catalyst bed is in the range 10% to 50%.

10. A process according to claim 9, in which said ebullated bed reactor of a) is operated in such a manner that the degree of expansion of the catalyst bed is in the range 15% to 25%.

11. A process according to claim 1, in which said feed of bio-renewable origin is a vegetable oil.

12. A process according to claim 1, in which said feed of bio-renewable origin is an animal fat.

13. A process according to claim 1, wherein said bio-renewable feed is not pretreated prior to hydrotreating and/or hydroconverting.

* * * * *